Figure 1:
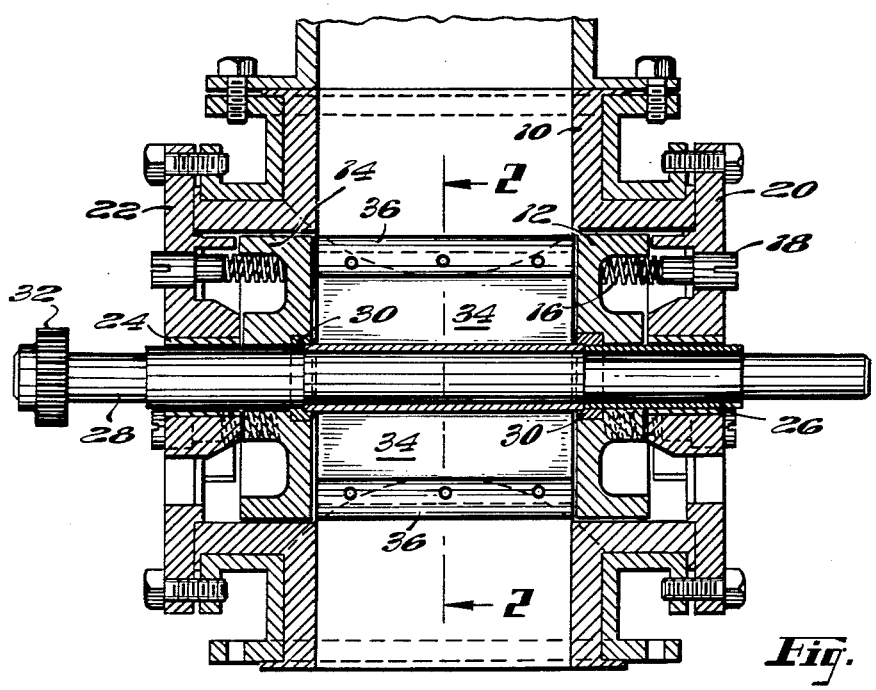

May 31, 1960     O. E. SPECHT ET AL     2,938,651

ROTARY VALVE

Filed June 8, 1956

INVENTORS
OTTO E. SPECHT AND
ROBERT S. BOYD.

BY Kenneth W Brown, Atty

United States Patent Office 2,938,651
Patented May 31, 1960

2,938,651
ROTARY VALVE

Otto E. Specht and Robert S. Boyd, Pampa, Tex., assignors to Godfrey L. Cabot, Inc., Boston, Mass., a corporation of Massachusetts Filed June 8, 1956, Ser. No. 590,273

3 Claims. (Cl. 222—338)

This invention relates to an improved rotary lock or valve by means of which free flowing materials may be transferred from one area to another without appreciable leakage of gas.

Rotary valves have been extensively employed in industry wherever there exists the necessity of recovering free flowing solid materials from gas streams under conditions such that mixing of the gas with a different atmosphere can not be tolerated. A typical example of such necessity is that of recovering carbon black from separators such as cyclones and the like. Since many of these operations are carried out at elevated temperatures a further problem arises from the necessity of moving the materials from a relatively high temperature area to one in which temperature is at, or near that of the atmosphere. Where such diverse temperature conditions prevail the valve is subjected to thermal stresses and corrosion causing distortion of and misfit between the static and moving parts.

The usual rotary valve comprises a cylindrical chamber or housing having an inlet and outlet for the passage of solid materials more or less diametrically therethrough. A rotor is mounted in the axis of the chamber and comprises a rotatable shaft having a plurality of radial vanes more or less symmetrically disposed therearound. The shaft is journalled in bearings in the fixed end walls and is connected by suitable means to a motor. In use the vanes tend to wear quite rapidly and the bearings likewise from abrasion with the solid material being carried through the valve. Consequently, the valve must be shut down frequently for replacement of vanes and bearing surfaces.

It is the principal object of the invention to provide an improved rotary lock or valve which is relatively trouble-free and can be maintained in use for substantially longer periods of time than can conventional devices of this type.

It is a further object of this invention to provide such apparatus which includes means for maintaining a reasonably tight fit between the walls of the valve chamber and the moving parts.

The apparatus of this invention comprises a cylindrical valve chamber or housing with conventional inlet and outlet conduits in opposite sides. The end walls are movable and held in place by means of springs. The rotor shaft extends through bushings in the end walls and are mounted in bearings external of the movable walls. The vanes are provided at their outer ends with cylindrical tips constructed of a relatively soft resilient shape retaining material such as aluminum or Teflon secured in such manner as to bear against the chamber walls with relatively gas tight fit in the course of rotation. Owing to the resiliency of these tips they can be installed with a sufficiently tight fit that even when worn they will continue to maintain contact with the chamber wall.

Figure 2:
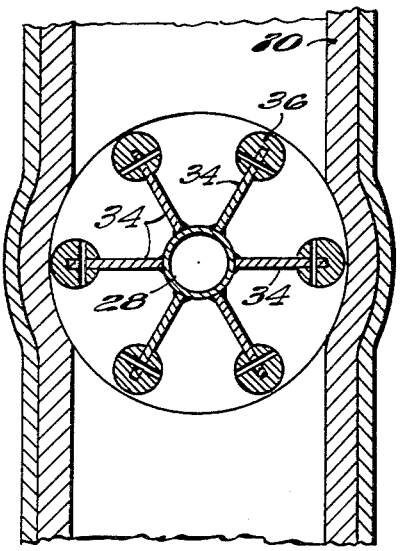

The invention will be more clearly understood from the following description of the apparatus in conjunction with the accompanying drawing in which Fig. 1 is a side view in cross section of the apparatus and Fig. 2 is a sectional end view taken along line 2—2 of Fig. 1.

The apparatus consists of a housing member 10 having a cylindrical midsection and inlet and outlet passages integral therewith in more or less conventional form. The midsection is enclosed by movable end walls 12 and 14 held in place by springs 16 bearing against bolts 18 screwed into fixed members 20 and 22 attached to the housing 10 by suitable means. Bearings 24 and 26 are mounted in the fixed members to support rotor shaft 28. End walls 12 and 14 are appropriately pierced to accommodate shaft 28, and bushings 30 are provided to inhibit leakage around the rotor shaft. Means including sprocket gear 32 are provided to effect rotation of rotor shaft 28.

Secured to rotor shaft 28 as by welding are vanes 34 spaced more or less symmetrically around the periphery of the shaft. Longitudinally slotted cylinders 36 are attached to the ends of vanes 34 in position to bear against the cylindrical wall of the body midsection. The cylinders 36 are constructed of a relatively soft, moderately resilient, heat-resistant material such as aluminum or Teflon but which is sufficiently rigid to hold its shape in service.

It will thus be seen that we have provided a new and improved rotary valve which is capable of extended service without the usual rapid deterioration experienced in prior art devices. Furthermore, this apparatus is more efficient than those previously known since the vanes which accomplish the locking action are always maintained in contact with both side and end walls of the valve chamber. Additionally, by employing bearings which are external to the chamber proper, rate of wear is greatly reduced since the bearings are protected from contamination by the solid material flowing through the valve chamber.

That the apparatus of this invention constitutes an important improvement over prior art devices of comparable type is clear when it is considered that an experimental model has operated for approximately two years in a pilot plant installation. During that time it never became necessary to replace or repair the stator cylinder or rotor vanes. Under identical conditions conventional rotary valves have given trouble after six or seven months' service, requiring reboring of the cylinder and replacement of rotor shaft, vanes and bearing parts. Even before the time when repairs became mandatory considerable leakage had developed which accelerated the rate of deterioration. These problems are completely absent from the apparatus of this invention which required only periodic replacement of the vane tips.

Having thus described our invention, we claim:

1. A solids feeder which comprises an outer housing enclosing a centrally-disposed cylindrical channel with inlet and outlet conduits connected thereinto, said cylindrical channel being bounded endwise by longitudinally movable end walls fitting tightly around a rotor shaft, said shaft being axially journaled within said cylindrical channel in bearings mounted at opposing points in said outer housing, impervious rigid vanes radially attached lengthwise and symmetrically to said rotor shaft, said vanes having relatively resilient but shape-retaining tips, spring members under compression individually mounted at symmetrically spaced positions around said rotor shaft between said movable end walls and the adjacent parts of said outer housing, the end surfaces and tips of the vanes bearing with relatively gas-tight fit against end and side walls respectively of said cylindrical channel, and means to revolve said rotor shaft.

2. A solids feeder comprising a cylindrical housing having longitudinally movable end walls and an axially disposed channel, a rotor shaft centrally journaled within said channel in bearings mounted in opposing points in the wall of said cylindrical housing, impervious rigid vanes affixed radially and symmetrically to said shaft fitted at their extremities with cylinders of a resilient, relatively shape-retaining material, said vanes and cylinders bearing with relatively gas-tight fit against said end walls and a portion of the peripheral walls of said channel, spring members under compression mounted symmetrically around said rotor shaft between said end walls and the adjacent parts of said wall of said cylindrical housing, means to conduct solids to and away from said cylindrical housing, and means to revolve said rotor shaft.

3. A solids feeder comprising a housing member, a cylindrical channel centrally disposed therein and adapted to receive and discharge said solids, said cylindrical channel having longitudinally movable end walls fitting tightly around a rotor shaft axially positioned within said cylindrical channel and journaled in bearings mounted at opposing points in the wall of said housing member, impervious rigid radial vanes affixed symmetrically around said shaft, said vanes being tipped with cylinders constructed of a relatively resilient, shape-retaining material, spring members under compression disposed symmetrically around said rotor shaft between said movable end walls and the adjacent parts of said housing member, and said vanes bearing with relatively gas-tight fit on the one hand endwise against said end walls and on the other hand in the direction of discharge of said solids against a portion of the peripheral wall of said cylindrical channel, and means to revolve said rotor shaft.

References Cited in the file of this patent

UNITED STATES PATENTS

| | | |
|---|---|---|
| 2,367,331 | Reece | Jan. 16, 1945 |
| 2,404,678 | Wuensch | July 23, 1946 |
| 2,420,557 | Mueller | May 13, 1947 |